United States Patent
Hivert

(10) Patent No.: US 10,567,019 B2
(45) Date of Patent: Feb. 18, 2020

(54) METHOD FOR SUPPRESSING ELECTROMAGNETIC INTERFERENCE IN AN AMPLITUDE MODULATED RADIO SIGNAL, IN PARTICULAR RECEIVED IN AN ELECTRIC OR HYBRID VEHICLE

(71) Applicants: Continental Automotive France, Toulouse (FR); Continental Automotive GmbH, Hannover (DE)

(72) Inventor: Grégoire Hivert, Coulombs (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/490,641

(22) PCT Filed: May 29, 2018

(86) PCT No.: PCT/FR2018/051240
§ 371 (c)(1),
(2) Date: Sep. 3, 2019

(87) PCT Pub. No.: WO2018/220323
PCT Pub. Date: Dec. 6, 2018

(65) Prior Publication Data
US 2019/0393913 A1     Dec. 26, 2019

(30) Foreign Application Priority Data

Jun. 1, 2017 (FR) ...................................... 17 54854

(51) Int. Cl.
*H04L 27/14*     (2006.01)
*H04B 17/336*   (2015.01)
(Continued)

(52) U.S. Cl.
CPC ........... *H04B 1/1036* (2013.01); *H04L 27/06* (2013.01); *H04L 41/0826* (2013.01)

(58) Field of Classification Search
CPC .... H04B 1/1036; H04B 1/1081; H04B 1/082; H04B 7/0404; H04B 7/0845;
(Continued)

(56) References Cited

U.S. PATENT DOCUMENTS 6,961,019 B1 * 11/2005 McConnell ............. G01S 19/21
                                                    342/357.59
7,065,162 B1 *  6/2006 Sorrells .................... H03D 7/00
                                                    375/343
(Continued)

FOREIGN PATENT DOCUMENTS

DE       10233909 A1    2/2004
EP        3035546 A1    6/2016

OTHER PUBLICATIONS

International Search Report and Written Opinion for International Application No. PCT/FR2018/051240, dated Jul. 25, 2018—9 pages.

*Primary Examiner* — Pablo N Tran
(74) *Attorney, Agent, or Firm* — RatnerPrestia

(57) ABSTRACT

A method for attenuating electromagnetic interference in an AM radio signal received by a radio receiver, so as to produce a filtered radio signal $Z_n$ defined by $Z_n = W_n^T Y_n$ at the time n, where $Y_n$ is a vector the components of which correspond to the radio signal received by a first antenna and to a second signal received by a second antenna connected to the source of interference, respectively, and $W_n$ is a vector the components of which correspond to the complex coefficients of an impulse response filter, with: $Zn = \overline{w}_{1,n} \cdot y_{1,n} + \overline{w}_{2,n} \cdot y_{2,n}$, by the introduction of a correlation between the real and imaginary parts of the complex coefficients. The complex coefficients being expressed in polar coordinates, so that (Continued)

$$w_{1,n} = g_{1,n} e^{j2\pi\theta_{1,n}} \text{ and } w_{2,n} = g_{2,n} e^{j2\pi\theta_{2,n}},$$

and of the implementation of a predetermined iterative algorithm configured to determine the $g_{1,n}$, $g_{2,n}$, $\theta_{1,n}$ and $\theta_{2,n}$ able to minimize the following cost function:

$$J_{CPA} = E\left\{\left|\frac{z}{|z_n|} - 1\right|^2\right\} = E\{e^{j\theta z_n} - 1\}.$$

8 Claims, 2 Drawing Sheets

(51) Int. Cl.
  *H04B 1/10* (2006.01)
  *H04L 12/24* (2006.01)
  *H04L 27/06* (2006.01)

(58) Field of Classification Search
  CPC ..... H04B 17/336; H04B 1/1027; H04L 27/06; H04L 41/0826; H04L 25/03057; H04L 2025/0363; H04L 27/14
  See application file for complete search history.

(56) References Cited

U.S. PATENT DOCUMENTS

| | | | |
|---|---|---|---|
| 7,899,106 B2* | 3/2011 | Camp, Jr. | H04L 27/2647 375/134 |
| 8,649,729 B2* | 2/2014 | Nightingale | H04K 3/28 375/134 |
| 9,246,736 B2* | 1/2016 | Sorrells | H03C 1/62 |
| 9,432,152 B2* | 8/2016 | Feher | G16H 10/60 |
| 2005/0031064 A1* | 2/2005 | Kolze | H04B 1/1027 375/350 |
| 2005/0239406 A1* | 10/2005 | Shattil | H01Q 3/26 455/63.1 |
| 2011/0263195 A1 | 10/2011 | Nightingale et al. | |
| 2012/0134394 A1* | 5/2012 | Allen | H04L 7/0008 375/219 |

\* cited by examiner

METHOD FOR SUPPRESSING ELECTROMAGNETIC INTERFERENCE IN AN AMPLITUDE MODULATED RADIO SIGNAL, IN PARTICULAR RECEIVED IN AN ELECTRIC OR HYBRID VEHICLE

CROSS REFERENCE TO RELATED APPLICATIONS

This application is the U.S. National Phase Application of PCT International Application No. PCT/FR2018/051240, filed May 29, 2018, which claims priority to French Patent Application No. 1754854, filed Jun. 1, 2017, the contents of such applications being incorporated by reference herein.

FIELD OF THE INVENTION

The invention relates to the field of attenuation of electromagnetic interference, in particular caused by the electric motor of a vehicle, with respect to an amplitude-modulated radio signal received by said vehicle.

More precisely, in the context of a radio receiver located on board a vehicle, in particular on board an electric vehicle, able to receive an AM signal (AM standing for "Amplitude Modulation"), the present invention aims to remove electromagnetic interference introduced into said AM radio signal by the operation of the electric motor.

BACKGROUND OF THE INVENTION

This electromagnetic interference, as is known, is in particular generated by the electric motor of such a vehicle.

A radio receiver, in particular in a multimedia system of a motor vehicle, is able to receive a radio signal, in particular an AM radio signal. Electromagnetic interference is generated by the motor of such vehicles, in particular the electric motor of an electric or hybrid vehicle, which perturbs the reception of the AM radio signal.

To remove this electromagnetic interference, it is known in the art to make use of filters implementing iterative algorithms, which algorithms are referred to as CPA algorithms, CPA standing for "Constant Phase Algorithm". As their name indicates, these CPA algorithms aim to ensure the processed AM radio signal has a constant phase.

More precisely, CPA algorithms are used to define the best filter to apply to the received AM radio signal, with a view to removing the electromagnetic interference therefrom.

Such an AM radio signal, received in modulated form by a radio receiver, is subjected to various sensors and to suitable filtering so that the corresponding demodulated radio signal is able to be played back under good conditions, in particular in the passenger compartment of a motor vehicle.

Those skilled in the art know the operating principle of an AM, that is to say amplitude-modulated, radio signal received by a suitable radio receiver, with a view to being demodulated and then played to listeners.

One known problem relating to the reception of an AM radio signal via a mobile radio receiver, in particular one integrated into an electric or hybrid motor vehicle, resides in the fact that electromagnetic interference, in particular generated by the electric motor in the case of an electric or hybrid vehicle, perturbs the received AM radio signal.

As a result, filtering, typically achieved by means of an impulse response filter ("FIR"), is necessary in order to remove said electromagnetic interference.

With reference to FIG. 1, to remove the electromagnetic interference from a received AM radio signal, impulse response filters FIR have been developed. These filters implement CPA algorithms (described below) configured to attenuate, in the received AM radio signal, expressed in complex baseband and denoted $y_n$, said electromagnetic interference, with a view to delivering a processed AM radio signal $z_n$.

In the prior art, the algorithms for removing electromagnetic interference are generally of the constant-phase type, as mentioned above Specifically, the principle of amplitude modulation ensures that the emitted radio signal has a constant phase. Thus, computational algorithms, called CPAs, have been developed and those skilled in the art are constantly seeking to improve them, with for main constraint to ensure, after computation, a substantially constant phase in the radio signal filtered within the receiver.

CPA algorithms are iterative computational algorithms the objective of which is to determine the real and imaginary parts of the complex coefficients to be applied to the complex vector corresponding to the received AM radio signal, expressed in complex baseband, with a view to achieving a combination allowing the electromagnetic interference present in the AM radio signal to be attenuated.

From a mathematical point of view, the principle presented above, in which the characteristic complex coefficients of an impulse response filter are attributed to the signals, expressed in complex baseband, received on the one hand by an antenna of a radio receiver, corresponding to an AM radio signal to which electromagnetic interference generated by a source of interference, such as an electric vehicle motor for example, has become added, and on the other hand by a second antenna connected to said source of interference, such as the aforementioned electric motor, corresponding to said interference, with a view to forming a filtered radio signal to be played after said electromagnetic interference has been canceled out, is expressed as follows.

The filtered radio signal is written:

$$z_n = W_n^T Y_n = [\overline{w}_{1,n} \ \overline{w}_{2,n}] \begin{bmatrix} y_{1,n} \\ y_{2,n} \end{bmatrix}$$

where $y_{1,n}$ is the radio signal, in complex baseband, received by the antenna in question of the radio receiver, corresponding to the emitted AM radio signal perturbed by electromagnetic interference, and $y_{2,n}$ is the signal received by the antenna receiving the noise from the source of interference, in particular the electric motor of an electric or hybrid vehicle, and $w_{1,n}$, $w_{2,n}$ are the complex coefficients attributed, via an impulse response filter FIR, to said received radio signal.

In the prior art, CPA algorithms are implemented to determine the complex vector $W_n$ able to minimize the following cost function:

$$J_{CPA} = E\{|z_n - |z_n||^2\}$$

Moreover, in the prior art, the vector $W_n$ of complex coefficients is considered to consist of linear complex numbers, said vector $W_n$ having the following form:

$$W_n = \begin{bmatrix} a_{1,n} + jb_{1,n} \\ a_{2,n} + jb_{2,n} \end{bmatrix}$$

The components of this vector $W_n$ of complex coefficients are independent of one another and the real and imaginary parts of each component are also.

The corresponding cost function may be decreased using the instantaneous gradient technique, in order to be written:

$$\nabla J_{CPA} = \mu \times \frac{Y_n}{\|Y_n\|^2} \times (\overline{z_n - |z_n|})$$

where $\mu$ is a chosen constant allowing the speed with which the gradient converges to be set, depending on the desired convergence stability and rapidity.

The way in which the complex coefficients are updated is then expressed by the following formula:

$$W_{n+1} = W_n - \mu \times \frac{Y_n}{\|Y_n\|^2} \times (\overline{z_n - |z_n|})$$

This algorithm, which is representative of the prior art, gives the curves of solutions in FIG. 2, with real part Re and imaginary part Im, and is liable to converge toward non-optimal solutions. In particular, although it is correct for the phase to converge toward 0, the curve of solutions of the prior art also allows the gain to converge toward 0, while being an objective solution for the CPA algorithm implemented.

To mitigate this major drawback, in the prior art, it is known to add a normalization coefficient to the updated equation of the complex coefficients to be implemented via an impulse response filter. Said update of the complex coefficients therefore becomes:

$$W_{n+1} = \left(W_n - \mu \times \frac{Y_n}{\|Y_n\|^2} \times (\overline{z_n - |z_n|})\right)\left(1 - \gamma + \frac{\gamma}{\|W_n\|^2}\right)$$

One major drawback of known filtering techniques and of CPA algorithms such as they are applied at the present time, with a view to removing the electromagnetic interference in particular produced by the electric motor of an electric or hybrid vehicle, resides in the fact that they sometimes converge slowly, and above all in the fact that they sometimes converge wrongly and have a poor stability. In other words, sometimes complex coefficients that meet the required conditions lead to a radio signal of poor quality being played.

SUMMARY OF THE INVENTION

It is to mitigate these drawbacks that an aspect of the present invention is provided, with a view to allowing electromagnetic interference in an AM radio signal received by a radio receiver, in particular one located on board a motor vehicle, to be removed by means of an improved filtering method.

To this end, an aspect of the present invention in particular makes provision to implement an iterative algorithm, for example of CPA-algorithm type, to determine the characteristics of a filter to be applied, on the basis of a specific cost function that said iterative algorithm is tasked with minimizing.

Said cost function is in particular expressed in polar coordinates and normalized in terms of gain, so that the convergence toward 0 of the phase is ensured.

In this way, the iterative algorithm in question converges more rapidly and more stably toward a determination of the vector of complex coefficients to be applied, by means of an impulse response filter in particular, to the signals, expressed in complex baseband, received by the antenna of the radio receiver in question and by the second antenna so as to remove the electromagnetic interference.

More precisely, an aspect of the present invention aims to attenuate, or even to remove, electromagnetic interference in particular generated by an electric motor of a vehicle, with respect to an AM radio signal received by a radio receiver.

To this end, said radio receiver intended to receive the emitted AM radio signal is connected to at least two radio reception antennas that are separate from each other, a first antenna receiving, at the time n, a first radio signal $y_{1,n}$ corresponding to the emitted AM radio signal perturbed by the electromagnetic interference, and a second antenna receiving, at the time n, the noise signal $y_{2,n}$, corresponding to the electromagnetic interference.

The radio first signal and the noise second signal are intended to be combined by way of an impulse response filter the determination of the coefficients of which is the aim of an aspect of the present invention.

More precisely, one subject of an aspect of the present invention is a method for attenuating electromagnetic interference in an amplitude-modulated radio signal received by a radio receiver, said electromagnetic interference being produced by a source of interference, so as to produce a filtered radio signal $Z_n$ defined by $Z_n = W_n^T Y_n$ at the time n, where $Y_n$ is a vector the components of which correspond to the radio signal received by a first antenna of the radio receiver, said received radio signal containing electromagnetic interference, and a second signal received by a second antenna connected to the source of interference, respectively, said second signal corresponding to the electromagnetic interference, in complex baseband, and $W_n$ is a vector the components of which correspond to the characteristic complex coefficients of an impulse response filter, said complex coefficients being intended to be applied to the received radio signal expressed in complex baseband and to the second radio signal expressed in complex baseband, respectively, in order to form, after combination, the filtered radio signal $Z_n$ in which the electromagnetic interference is attenuated, the method according to an aspect of the invention comprising determining complex coefficients of the vector $W_n$ such that:

$$Z_n = W_n^T Y_n = \overline{w}_{1,n} \cdot y_{1,n} + \overline{w}_{2,n} \cdot y_{2,n},$$

by means of the introduction of a correlation between the real and imaginary parts of said complex coefficients, said complex coefficients being expressed in polar coordinates, so that $$w_{1,n} = g_{1,n} e^{j2\pi\theta_{1,n}} \text{ and } w_{2,n} = g_{2,n} e^{j2\pi\theta_{2,n}},$$

and of the implementation of a predetermined iterative algorithm configured to determine the $g_{1,n}$, $g_{2,n}$, $\theta_{1,n}$ and $\theta_{2,n}$ able to minimize the following cost function:

$$J_{CPA} = E\left\{\left|\frac{z}{|z_n|} - 1\right|^2\right\} = E\{e^{j\theta z_n} - 1\}$$

so as to obtain the vector $W_n$ of characteristic complex coefficients of the impulse response filter to be applied to the received radio signal $Y_n$ in order to attenuate the electromagnetic interference thereof.

By virtue of the method according to an aspect of the invention, the implemented iterative algorithm is able to rapidly and stably converge toward a limited set of solutions ensuring a zero phase and a nonzero gain in the filtered radio signal. Specifically, the introduction of a correlation between the real and imaginary parts of the complex coefficients of the filter amounts to integrating, for the implementation of the iterative algorithm, the existence of a correlation between the signals $y_{1,n}$ and $y_{2,n}$.

Advantageously, said iterative adaptation algorithm is a constant-phase adaptation algorithm.

According to one embodiment, the method according to an aspect of the invention comprises the implementation of the iterative adaptation algorithm consisting in determining the complex gains $G_n$ and phases $\Theta_n$ able to minimize over time the cost function characterized by the following instantaneous gradient:

$$\nabla J_{CPA} = \nabla \bar{z}_n \times f(z_n) + \nabla z_n \times f(\bar{z}_n)$$

with $f(\propto) = \frac{1}{2|\propto|^3}(\propto^2 - |\propto|^2)$, and $\nabla z_n = \frac{\partial z_n}{\partial W_n} = \begin{bmatrix} \frac{\partial z_n}{\partial g_n} \\ \frac{\partial z_n}{\partial \theta_n} \end{bmatrix} = \begin{bmatrix} \exp(-j\Theta_n)Y_n \\ -jG_n\exp(-j\Theta_n)Y_n \end{bmatrix}$, where $G_n$ is a vector composed of the gains of the complex coefficients at the time n and $\Theta_n$ is the vector composed of the phases of the complex coefficients.

According to one embodiment, the respective variations in $G_n$, $\Theta_n$ over time are computed by means of the following formulae:

$$G_{n+1} = G_n - \mu_g \frac{1}{|z_n|^3} \times \text{Re}[(z_n^2 - |z_n|^2)\exp(j\Theta_n)\overline{Y_n}]$$

$$\Theta_{n+1} = \Theta_n - \mu_\theta \frac{1}{|z_n|^3} \times \text{Im}[(z_n^2 - |z_n|^2)G_n\exp(j\Theta_n)\overline{Y_n}]$$

where $G_n$, is a vector composed of the gains of the complex coefficients at the time n, $\Theta_n$ is the vector composed of the phases of the complex coefficients, and $\mu_g$ and $\mu_\theta$ are constants chosen depending on the rapidity and precision desired for the convergence of the iterative adaptation algorithm implemented.

An aspect of the present invention also relates to a radio receiver comprising a microcontroller configured to implement the method such as briefly described above.

An aspect of the present invention also relates to a motor vehicle comprising a radio receiver such as briefly described above.

According to one embodiment, said vehicle comprising an electric motor, the first antenna is a receiving antenna of the radio receiver and the second antenna is an antenna connected to said electric motor of the motor vehicle, said electric motor being the source of interference.

BRIEF DESCRIPTION OF THE DRAWINGS

An aspect of the invention will be better understood on reading the following description, which is given solely by way of example, with reference to the appended drawing, in which.

DETAILED DESCRIPTION OF THE PREFERRED EMBODIMENTS

Figure 1:
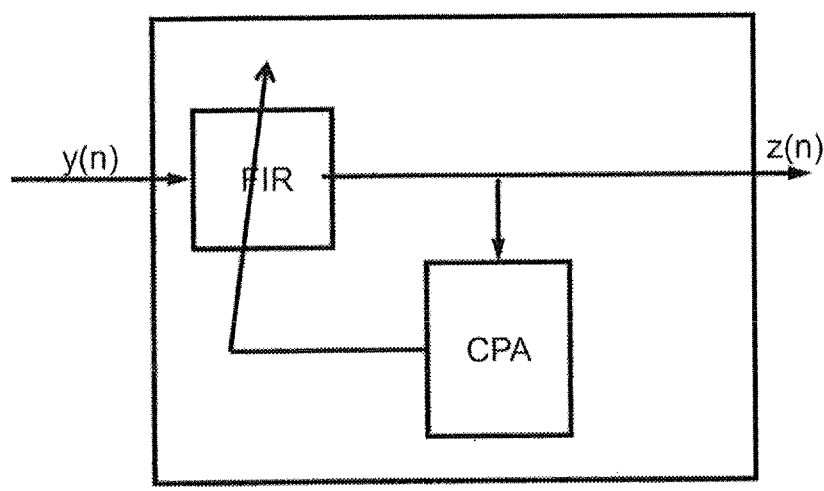
FIG. 1 shows the block diagram of a method for canceling out electromagnetic interference by means of a filter implementing a CPA algorithm.
Figure 2:
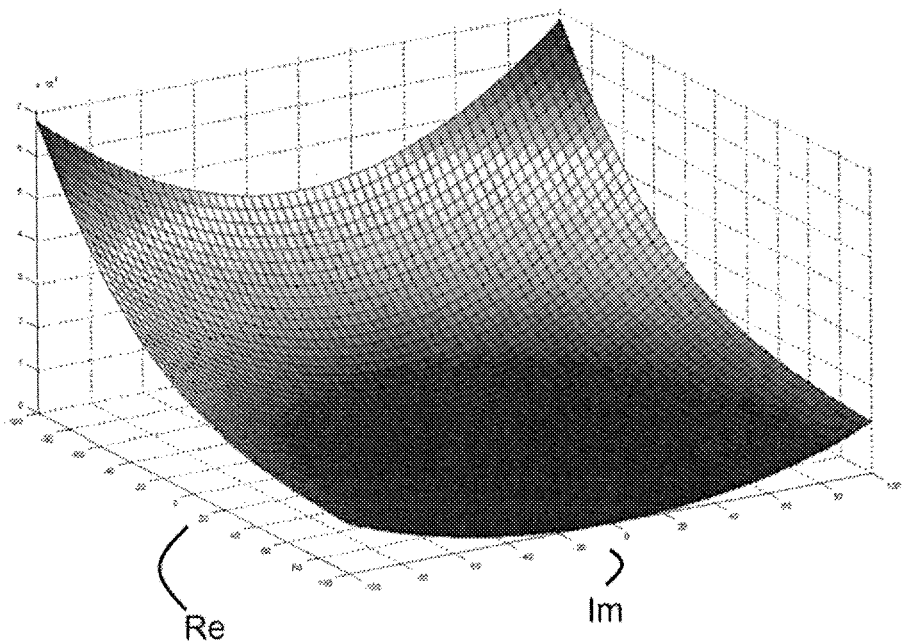
FIG. 2 shows the curve of the set of possible solutions in the context of a CPA algorithm such as implemented in the prior art.

The method for removing electromagnetic interference from an AM radio signal, according to an aspect of the invention, is presented with a view to an implementation, principally, in a radio receiver of a multimedia system on board a motor vehicle.

However, the implementation of an aspect of the present invention in any other technical field, in particular in any type of AM radio receiver, is also envisaged.

An aspect of the present invention proposes to rewrite, in a specific way, the cost function to be minimized in the context of the procedure aiming to determine, as described above, the components of the vector of complex coefficients to be applied to the AM radio signal received with a view to removing the electromagnetic interference therefrom.

The model of observation of the radio signal filtered by applying the aforementioned vector of complex coefficients is expressed in the following way:

$$Z_n = W_n^T Y_n = \bar{w}_{1,n} \cdot y_{1,n} + \bar{w}_{2,n} \cdot y_{2,n}$$

with $W_n = \begin{bmatrix} w_{1,n} \\ w_{2,n} \end{bmatrix} = \begin{bmatrix} G_{1,n}e^{j2\pi\theta_{1,n}} \\ G_{2,n}e^{j2\pi\theta_{2,n}} \end{bmatrix}$, where $Z_n$, is the filtered radio signal, $y_{1,n}$ is the radio signal received, in complex baseband, by the antenna in question of the radio receiver, said received radio signal $y_{1,n}$ comprising the radio signal to be played and the electromagnetic interference, $y_{2,n}$ is the signal received by a second antenna, connected to the source of electromagnetic interference, in particular the electric motor of a hybrid or electric vehicle, said second signal corresponding to said electromagnetic interference, and $w_{1,n}$, $w_{2,n}$ are the vectors of the constituent complex coefficients of the filter to be applied to the received radio signal $Y_n$.

To exploit the fact that only the phase is a constraint to be considered in the implementation of CPA algorithms, an aspect of the present invention proposes to express the complex coefficients, corresponding to the coefficients of the filter to be applied to the received radio signal $Y_n$, corresponding to a received AM radio signal and to a second signal corresponding to the electromagnetic interference, in polar coordinates:

$$w_{1,n} = g_{1,n}e^{j2\pi\theta_{1,n}} \text{ and } w_{2,n} = g_{2,n}e^{j2\pi\theta_{2,n}}$$

Hence, the filtered signal is also written in polar coordinates, allowing the computation of the gradient to be simplified:

$$Z_n = W_n^T Y_n = G_{Z_n} \times e^{\theta Z_n}$$

Hence, according to an aspect of the invention, an iterative algorithm, in particular a CPA algorithm, is implemented to determine the coefficients $w_n$ able to minimize the following cost function:

$$J_{CPA} = E\left\{\left|\frac{z_n}{|z_n|} - 1\right|^2\right\} = E\{e^{j\theta z_n} - 1\}$$

The instantaneous gradient of this cost function is written:

$$\nabla J_{CPA} = \nabla(\bar{z}) \times f(z) + \nabla(z) \times f(\bar{z})$$

with $f(\alpha) = \frac{1}{2|\alpha|^3}(\alpha^2 - |\alpha|^2)$

The partial derivatives are written:

$$\nabla z_n = \frac{\partial z_n}{\partial Wn} = \begin{bmatrix} \frac{\partial z_n}{\partial g_n} \\ \frac{\partial z_n}{\partial \theta_n} \end{bmatrix} = \begin{bmatrix} \exp(-j\Theta_n)Y_n \\ -jG_n^o\exp(-j\Theta_n)Y_n \end{bmatrix}$$

$$\nabla \bar{z}_n = \frac{\partial \bar{z}_n}{\partial Wn} = \begin{bmatrix} \frac{\partial \bar{z}_n}{\partial g_n} \\ \frac{\partial \bar{z}_n}{\partial \theta_n} \end{bmatrix} = \begin{bmatrix} \exp(j\Theta_n)\overline{Y_n} \\ jG_n\exp(j\Theta_n)\overline{Y_n} \end{bmatrix}$$

where $G_n$ is a vector composed of the gains of the complex coefficients of the filter to be applied at the time n and $\Theta_n$ is the vector composed of the phases of the complex coefficients of the filter to be applied at the time n.

The gains and phases of each of the complex coefficients to be determined are therefore updated over time by virtue of the following formulae:

$$\begin{cases} G_{n+1} = G_n - \mu_g \frac{1}{|z_n|^3} \times \text{Re}[(z_n^2 - |z_n|^2)\exp(j\Theta_n)\overline{Y_n}] \\ \Theta_{n+1} = \Theta_n - \mu_\theta \frac{1}{|z_n|^3} \times \text{Im}[(z_n^2 - |z_n|^2)G_n\exp(j\Theta_n)\overline{Y_n}] \end{cases}$$

where $\mu_g$ and $\mu_\theta$ are constants chosen depending on the convergence rapidity, stability and precision desired for the algorithm.

The strong interdependency between the real and imaginary parts of the complex coefficients to be determined will be evident from these formulae.

The implementation of iterative algorithms on these formulae, in particular CPA algorithms, with the constraint of minimizing the cost function described above, thus converges more efficiently than in the prior art. Specifically, zero-gain solutions are no longer possible and the convergence of the phase toward 0 is in contrast ensured.

Figure 3:
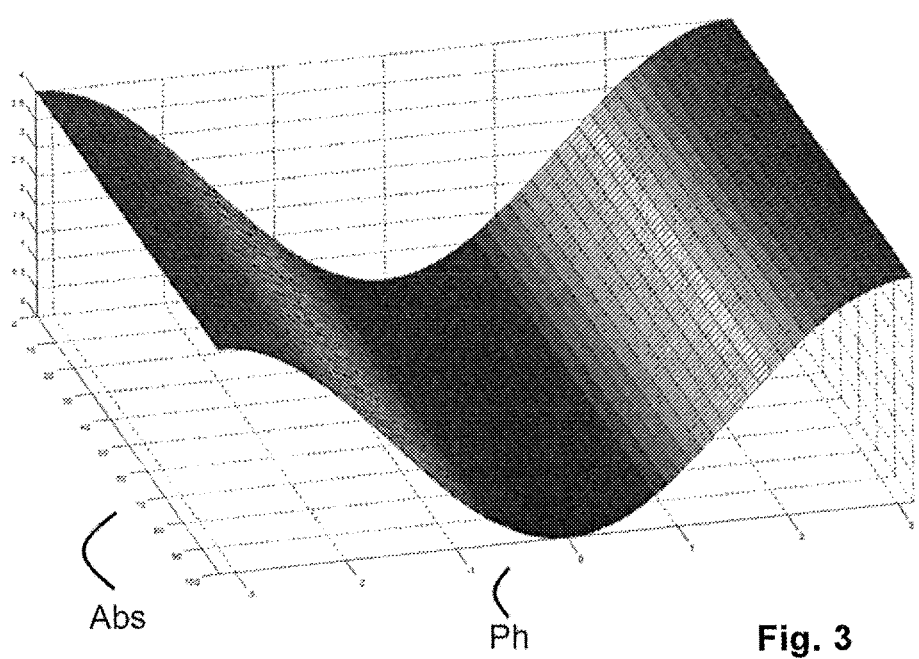
FIG. 3 shows the curve of the set of possible solutions in the context of a CPA algorithm such as implemented according to an aspect of the invention.

FIG. 3 thus shows the curve of the solutions of a CPA algorithm implemented on the formulae described above, with their respective moduli Abs and their respective phases Ph.

By virtue of an aspect of the invention, the CPA algorithms thus converge toward a subset of solutions smaller than the set of possible solutions of CPA algorithms such as implemented in the prior art.

The implementation of the method according to an aspect of the invention, via an impulse response filter, therefore allows electromagnetic interference to be removed from an AM radio signal received by an antenna of a radio receiver of a vehicle, said interference being produced by the motor, in particular the electric motor, of such a vehicle, with a better stability and a better rapidity than in the prior art.

It will furthermore be noted that aspects of the present invention are not limited to the embodiment described above, making recourse to CPA algorithms, and has variants that will appear obvious to anyone skilled in the art; in particular, other types of algorithms may be implemented.

The invention claimed is:

1. A method for attenuating electromagnetic interference in an amplitude-modulated radio signal received by a radio receiver, said electromagnetic interference being produced by a source of interference, so as to produce a filtered radio signal $Z_n$ defined by $Z_n = W_n^T Y_n$, at the time n, where $Y_n$ is a vector the components of which correspond to the radio signal received by a first antenna of the radio receiver, said received radio signal containing electromagnetic interference, and a second signal received by a second antenna connected to the source of interference, respectively, said second signal corresponding to the electromagnetic interference, in complex baseband, and $W_n$ is a vector the components of which correspond to the characteristic complex coefficients of an impulse response filter, said complex coefficients being intended to be applied to the received radio signal expressed in complex baseband and to the second radio signal expressed in complex baseband, respectively, in order to form, after combination, the filtered radio signal $Z_n$ in which the electromagnetic interference is attenuated, the method comprising determining complex coefficients of the vector $W_n$ such that:

$$Z_n = W_n^T Y_n = \overline{w}_{1,n} \cdot y_{1,n} + \overline{w}_{2,n} \cdot y_{2,n},$$

by the introduction of a correlation between the real and imaginary parts of said complex coefficients, said complex coefficients being expressed in polar coordinates, so that $$w_{1,n} = g_{1,n}e^{j2\pi\theta_{1,n}} \text{ and } w_{2,n} = g_{2,n}e^{j2\pi\theta_{2,n}},$$

and of the implementation of a predetermined iterative algorithm configured to determine the $g_{1,n}$, $g_{2,n}$, $\theta_{1,n}$ and $\theta_{2,n}$ able to minimize the following cost function:

$$J_{CPA} = E\left\{\left|\frac{z_n}{|z_n|} - 1\right|^2\right\} = E\{e^{j\theta z_n} - 1\}$$

so as to obtain the vector $W_n$ of characteristic complex coefficients of the impulse response filter to be applied to the received radio signal $Y_n$ in order to attenuate the electromagnetic interference thereof.

2. The method as claimed in claim 1, wherein said iterative adaptation algorithm is a constant-phase adaptation algorithm.

3. The method as claimed in claim 2, comprising the implementation of the iterative adaptation algorithm consisting in determining the complex gains $G_n$ and phase $\Theta_n$ able to minimize over time the cost function characterized by the following instantaneous gradient:

$$\nabla J_{CPA} = \nabla \bar{z}_n \times f(z_n) + \nabla z_n \times f(\bar{z}_n)$$

with $f(\propto) = \dfrac{1}{2|\propto|^3}(\propto^2 - |\propto|^2)$, and $\nabla z_n = \dfrac{\partial z_n}{\partial Wn} = \begin{bmatrix} \dfrac{\partial z_n}{\partial g_n} \\ \dfrac{\partial z_n}{\partial \theta_n} \end{bmatrix} = \begin{bmatrix} \exp(-j\Theta_n)Y_n \\ -jG_n\exp(-j\Theta_n)Y_n \end{bmatrix}$, where $G_n$ is a vector composed of the gains of the complex coefficients at the time n and $\Theta_n$ is the vector composed of the phases of the complex coefficients.

4. The method as claimed in claim 1, comprising the implementation of the iterative adaptation algorithm consisting in determining the complex gains $G_n$ and phase $\Theta_n$ able to minimize over time the cost function characterized by the following instantaneous gradient:

$$\nabla J_{CPA} = \nabla \bar{z}_n \times f(z_n) + \nabla z_n \times f(\bar{z}_n)$$

with $f(\propto) = \dfrac{1}{2|\propto|^3}(\propto^2 - |\propto|^2)$, and $\nabla z_n = \dfrac{\partial z_n}{\partial Wn} = \begin{bmatrix} \dfrac{\partial z_n}{\partial g_n} \\ \dfrac{\partial z_n}{\partial \theta_n} \end{bmatrix} = \begin{bmatrix} \exp(-j\Theta_n)Y_n \\ -jG_n\exp(-j\Theta_n)Y_n \end{bmatrix}$, where $G_n$ is a vector composed of the gains of the complex coefficients at the time n and $\Theta_n$ is the vector composed of the phases of the complex coefficients.

5. The method as claimed in claim 4, wherein the respective variations in $G_n$, $\Theta_n$ over time are computed by the following formulae:

$$G_{n+1} = G_n - \mu_g \dfrac{1}{|z_n|^3} \times \operatorname{Re}[(z_n^2 - |z_n|^2)\exp(j\Theta_n)\overline{Y_n}]$$

$$\Theta_{n+1} = \Theta_n - \mu_\theta \dfrac{1}{|z_n|^3} \times \operatorname{Im}[(z_n^2 - |z_n|^2)G_n\exp(j\Theta_n)\overline{Y_n}]$$

where $G_n$ is a vector composed of the gains of the complex coefficients at the time n, $\Theta_n$ is the vector composed of the phases of the complex coefficients, and $\mu_g$ and $\mu_g$ are constants chosen depending on the rapidity and precision desired for the convergence of the iterative adaptation algorithm implemented.

6. A radio receiver comprising a microcontroller configured to implement the method as claimed in claim 1.

7. A motor vehicle comprising a radio receiver as claimed in claim 6.

8. The motor vehicle as claimed in claim 7, said vehicle comprising an electric motor, wherein the first antenna is a receiving antenna of the radio receiver and the second antenna is an antenna connected to said electric motor of the motor vehicle, said electric motor being the source of interference.

\* \* \* \* \*